Figure 1:
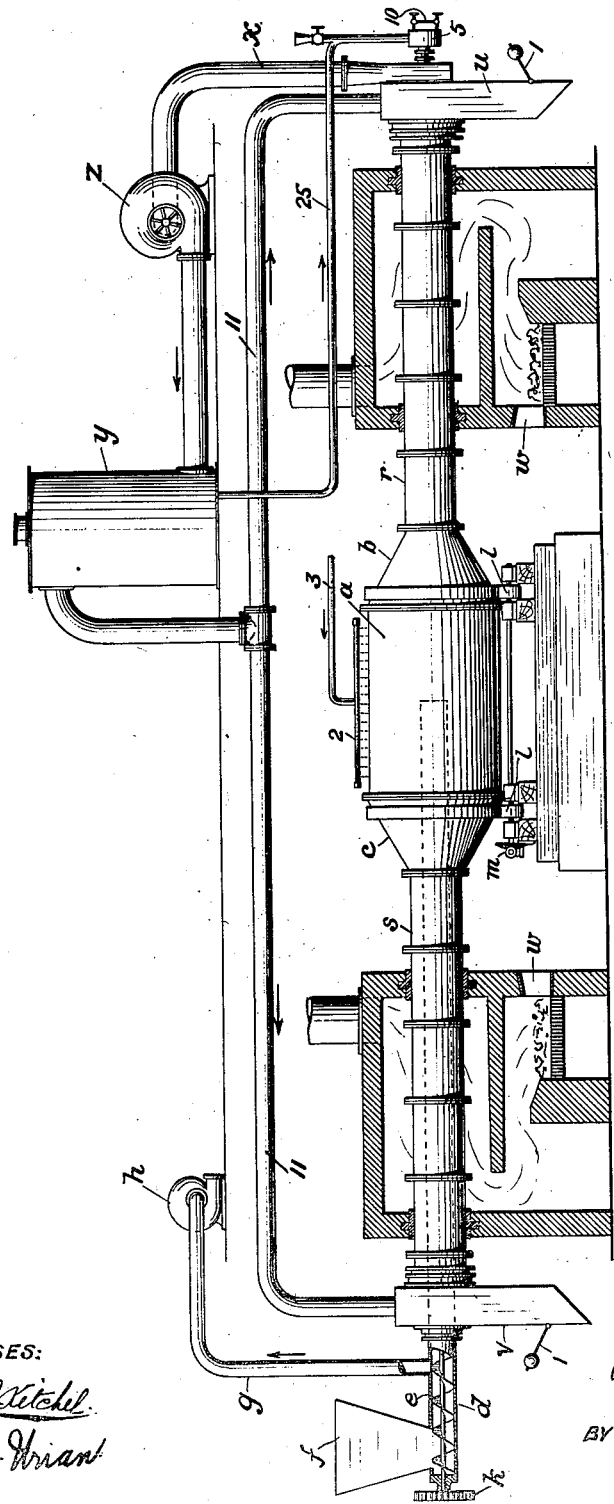

F. I. DU PONT.
METHOD OF GRAVITY LIQUID SEPARATION OF SOLIDS.
APPLICATION FILED DEC. 1, 1909.

1,064,459.

Patented June 10, 1913.
3 SHEETS—SHEET 1.

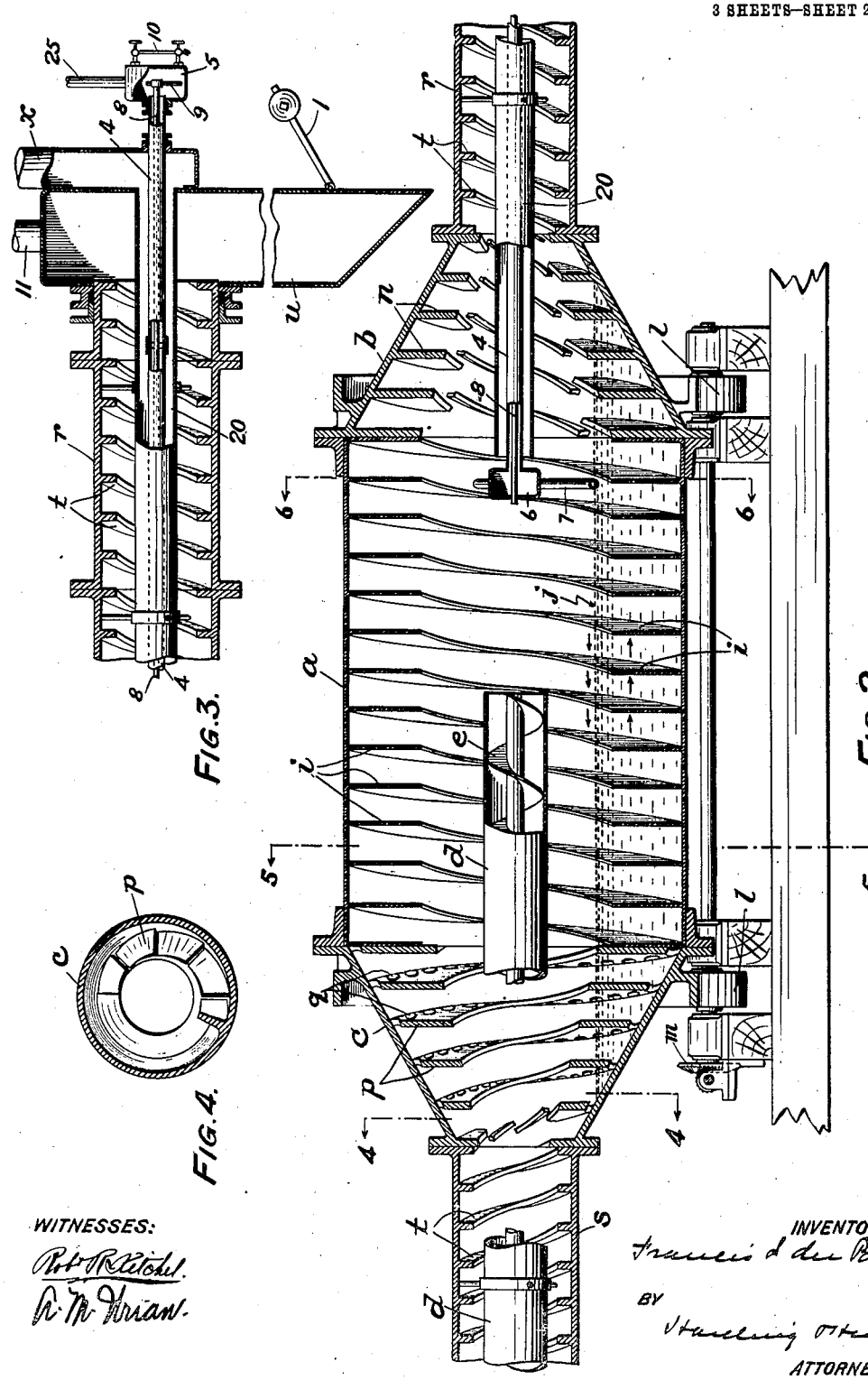

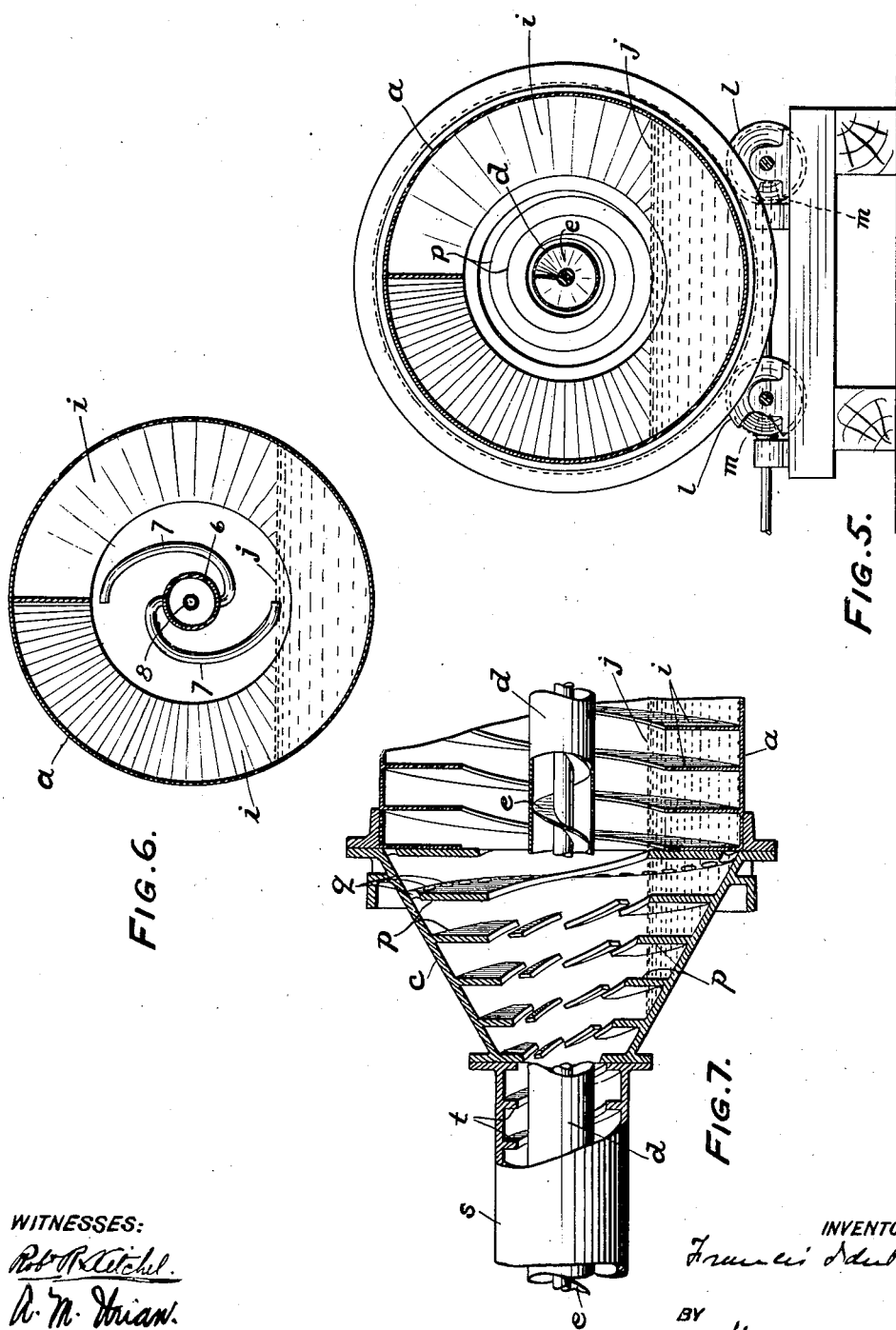

UNITED STATES PATENT OFFICE.

FRANCIS I. du PONT, OF WILMINGTON, DELAWARE.

METHOD OF GRAVITY LIQUID SEPARATION OF SOLIDS.

1,064,459.   Specification of Letters Patent.   Patented June 10, 1913.

Application filed December 1, 1909. Serial No. 530,759.

*To all whom it may concern:*

Be it known that I, FRANCIS I. DU PONT, a citizen of the United States, residing at Wilmington, county of Newcastle, and State of Delaware, have invented a new and useful Improvement in Methods of Gravity Liquid Separation of Solids, of which the following is a full, clear, and exact description, reference being had to the accompanying drawings, which form a part of this specification.

My invention has for its object certain improvements in the method of gravity liquid separation of solids, as for instance for separating in ores the highly metallic portion from the leaner and useless portion.

In my improved method I use a liquid other than water which is capable of being vaporized so that any liquid carried off in the separated ingredients may be vaporized and thus removed from the ore and may be condensed and returned to the separating vessel. The liquid may either be of greater density than one of the ingredients and less than that of the other, or of greater density than water, but of less density than either ingredient to be separated. Speaking generally, the ore to be separated, for example, limonite, in a divided condition is conveyed into a vessel containing this liquid which may be stannic chlorid which has a specific gravity of 2.27, is liquid at ordinary temperature, and vaporizes at 114° C. If the specific gravity of the liquid is greater than one ingredient, the silicious material and the iron ore containing iron oxid and silicious material, and the specific gravity of the liquid being less than the purer iron oxid it, the purer iron oxid, will sink, or tend to sink, to the bottom, and the other ingredients named, the silicious material, and the iron ore, containing iron oxid and silicious material, will rise or tend to rise to the surface. If the liquid be of greater specific gravity than water, but less specific gravity than either ingredient, the increase of the lessening of the tendency of the lighter ingredient to sink as the specific gravity of the liquid becomes greater, increases faster than does the corresponding tendency of the heavier ingredient. Hence the lighter ingredients rise more readily to the surface than the heavier ingredients. While in this vessel containing this liquid the upper portion of the liquid is caused to flow in one direction and the lower portion of the liquid in the other direction, thus there is a continuous flow of the liquid in the apparatus. Agitation is also produced therein. The ingredients in the upper portion of the liquid pass to one end of the apparatus, and the ingredients in the lower portion to the other end of the apparatus. The material at each end being carried free from the liquid, except from such as adheres to the particles, into and through a heating chamber where any liquid carried off is vaporized, the vapors are returned to the separating vessel where they are condensed to as great an extent as possible, the excess not condensed being condensed in a condenser and returned to the separating vessel.

I will now describe the apparatus for carrying out my process or method as illustrated in the accompanying drawings:

Figure 1 is an elevation of my apparatus partially broken away. Fig. 2 is a longitudinal section through separating drum. Fig. 3 is a longitudinal section through one end of apparatus. Figs. 4, 5 and 6 are sections respectively on the lines 4—4; 5—5 and 6—6 of Fig. 2. Fig. 7 is a partial view showing modification of left hand conical end, of Fig. 2.

$a$ is a cylindrical vessel having the conical extensions $b$ and $c$.

$d$ is the inlet tube through which the ore to be separated passes into the cylinder $a$. In the interior of this tube is the conveyer $e$ for carrying the ore through the tube.

$f$ is the receiving hopper opening into the tube $d$.

$g$ is a pipe extending from the tube $d$ and connected with the suction device $h$ to prevent any air entering the cylinder with the ore.

The interior of the cylinder has the projecting spiral blade $i$ which projects from the inner periphery of the cylinder.

$j$ represents the liquid level. Where the ore to be separated is, as hereinbefore stated, limonite, and the liquid stannic chlorid, such liquid is of greater specific gravity than water and of less specific gravity than the ingredients of the ore.

The end of the shaft carrying the conveyer has the gear $k$ which is rotated by appropriate means, not shown.

The cylinder $a$ and its extensions are supported on the rollers $l$, and these rollers are rotated by means of the gearing $m$.

In the conical end $b$ is the peripheral sectional projecting spiral blade $n$, the sections being staggered with respect to each other, so as to leave a space between them. In the conical end $c$ is the spiral blade $p$, some of the turns of which having orifices $q$. Beyond the conical ends $b$ and $c$ are the cylindrical portions $r$ and $s$, each provided with conveying blades $t$. These cylindrical portions terminate in the hoppers $u$ and $v$ respectively. The cylindrical portions $r$ and $s$ each extend through a furnace in which the liquid is driven off in the form of vapor. Each of the hoppers $u$ and $v$ has a slide operated by the lever 1 for closing the discharge end of the hopper and preventing the ingress of air.

The exterior of the cylinder $a$ has water sprayed upon it from the sprayer 2, fed by the pipe 3.

In order to determine the level of the liquid in the cylinder and maintain its level constant, I use the following construction: 4 is a pipe which passes centrally through the conical end $b$ and its cylindrical extension and terminates in the reservoir 5, which is non rotatably mounted. Surrounding the pipe 4 is a sheet metal pipe 20, having an open end in cylinder $a$. The gas from the interior of cylinder passes into the space between the two pipes 20 and 4. $x$ is a pipe leading from pipe 20 to condenser $y$. On this pipe is the suction fan $z$. From the top of the condenser $y$, pipes 11 lead to the respective hoppers $u$ and $v$. By this arrangement the space between the pipes 20 and 4 is maintained cool, thus maintaining the liquid in pipe 4 as a liquid. The inner end of pipe 4 terminates in the reservoir 6. From this reservoir 6 extend the curved ended pipes 7, the mouths of which are at the desired level of the liquid in the cylinder. Extending through the pipe 4 is a smaller pipe 8, the inner end of which passes through reservoir 6 and opens into cylinder $a$, the outer end terminating in the pipe 9, having curved ends, in the reservoir 5. A pipe 25 leads from the lower end of condenser $y$ to the reservoir 5. When the cylinder $a$, its conical ends, and extensions are revolved and the material fed therein, and liquid being in the cylinder to the level shown, there is a circulation of the liquid as shown by the arrows. The lighter ingredients are carried to the conical end $c$ and the heavier to the conical end $b$, the heavier and lighter ingredients separating during this travel. In the conical end $b$ the blades carry the heavier ingredient forward and upward, and due to the staggering of the blades, the liquid runs off so that when the cylindrical extension is reached, it is free from all but the adhering liquid. Further movement in the cylindrical extension carries it through the evaporator, the fumes passing back to cylinder $a$ where they are condensed by the spray. In a similar manner when the lighter ingredients are carried to the conical end $c$, the blades, as it were, skim off the solids, the liquid escaping through the orifices. If desired, as shown in Fig. 7, only the first few turns of the spiral may be perforated, as this may be sufficient to carry off practically all the liquid and the remainder of the spiral may be staggered, as shown with respect to the spiral in end $b$, Fig. 2. This material in this cylindrical extension, as was done with respect to the heavier ingredient, passes through the evaporator, the gases returning to the cylinder $a$ where they are condensed. If the liquid tends to rise in the cylinder beyond its desired height, the pipe 7 will catch it and through reservoir 6 and pipe 4 deliver it to reservoir 5. By means of the gage 10 in connection with said receiver, the height of the liquid in the reservoir 5 may readily be determined. The pipe 9 will constantly deliver liquid from reservoir 5 to the cylinder, but, being smaller, always in less quantity than it would be delivered from the cylinder $a$ to the reservoir 5, if $a$ should contain an excess. This, with the liquid passing through the pipes between the condenser and reservoir 5, enables the level of the liquid in the cylinder to be maintained.

The purpose of the system of piping, fan and condenser $x$, $z$ and $y$ is to insure definitely that the flow of vapor shall be from the evaporators to the central cylinder which is cooled; also to condense any excess of vapors which may not be condensed in the cylinder $a$. The purpose of the return pipes 11, is to avoid the necessity for the entrance of any more atmospheric air than is absolutely unavoidable, using in place thereof air always charged with whatever amount of vapors it will contain, after having passed through the condenser, this therefore, produces a substantially closed system in which no vapors or substantially no vapors are carried off by any entering or escaping air.

The purpose of the fan $h$ and pipe $g$ is to determine sufficient suction in the pipe $e$ to balance the tendency of the entering solids to carry air into the cylinder $a$.

It may be seen by this apparatus not only is separation readily made, but there is practically no loss of liquid used as the separating medium, there being a circulation back of the absorbed liquid of separation. Finally, the apparatus is practically a sealed apparatus.

I do not claim in this application the apparatus herein described as the same forms the subject matter of an application filed by me January 25th, 1910, Serial No. 539,960.

Having now fully described my invention, what I claim and desire to protect by Letters Patent is:

1. The process of gravity liquid separation of solids, which consists in immersing the solids to be separated in a volatile gravity liquid, separately removing from the bath the separated constituents of different specific gravity, volatilizing the gravity liquid carried off by each constituent, condensing the same and returning the same to the separating bath and maintaining the circuit of the liquid carried off from the bath by the constituents from its departure from the bath until return to the bath out of connection with the air.

2. The process of gravity liquid separation of solids, which consists in immersing the solids to be separated in a volatile gravity liquid, separately removing from the bath the separated constituents of different specific gravity, volatilizing the gravity liquid carried off by each constituent, condensing the same and returning the same to the separating bath, and maintaining the circuit including the bath, the liquid carried off by the constituents, the vaporization and condensation thereof out of connection with the air.

In testimony of which invention, I have hereunto set my hand, at Philadelphia, on this 26th day of November, 1909.

FRANCIS I. du PONT.

Witnesses:
M. M. HAMILTON,
A. M. URIAN.